(12) United States Patent
Kobayashi

(10) Patent No.: US 11,687,168 B2
(45) Date of Patent: Jun. 27, 2023

(54) INFORMATION PROCESSING APPARATUS AND CONTROL METHOD OF SUCH AN INFORMATION PROCESSING APPARATUS

(71) Applicant: CANON KABUSHIKI KAISHA, Tokyo (JP)

(72) Inventor: Hiroaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/685,281

(22) Filed: Mar. 2, 2022

(65) Prior Publication Data

US 2022/0291757 A1  Sep. 15, 2022

(30) Foreign Application Priority Data

Mar. 10, 2021 (JP) .............................. JP2021-038672

(51) Int. Cl.
| | | |
|---|---|---|
| G06F 3/16 | (2006.01) | |
| G06F 3/023 | (2006.01) | |
| G06F 3/04886 | (2022.01) | |
| G06F 9/455 | (2018.01) | |
| H04N 1/00 | (2006.01) | |

(52) U.S. Cl.
CPC ........ *G06F 3/0236* (2013.01); *G06F 3/04886* (2013.01); *G06F 9/45558* (2013.01); *H04N 1/00411* (2013.01); *G06F 2009/45579* (2013.01)

(58) Field of Classification Search
CPC ...... G06F 3/048; G06F 3/1454; G06F 3/0236; G06F 3/16; G09G 2370/16; G09G 2354/00
See application file for complete search history.

(56) References Cited

U.S. PATENT DOCUMENTS

| | | | | |
|---|---|---|---|---|
| 9,967,427 | B2* | 5/2018 | Ooba | H04N 1/00344 |
| 10,455,630 | B2* | 10/2019 | Tanji | H04W 76/14 |
| 11,431,857 | B2* | 8/2022 | Naito | H04L 51/42 |
| 2010/0007916 | A1* | 1/2010 | Ikeda | H04N 1/444 |
| | | | | 358/1.15 |
| 2015/0264220 | A1 | 9/2015 | Tsukada | |
| 2017/0019546 | A1* | 1/2017 | Tse | G03G 15/5016 |
| 2017/0214824 | A1* | 7/2017 | Ooba | H04N 1/00408 |
| 2017/0371537 | A1 | 12/2017 | Sato | |
| 2019/0387109 | A1* | 12/2019 | Naito | H04W 12/50 |
| 2019/0394051 | A1* | 12/2019 | Kakutani | H04N 1/00408 |
| 2022/0229550 | A1* | 7/2022 | Marsden | G06F 3/0482 |

FOREIGN PATENT DOCUMENTS

| | | | |
|---|---|---|---|
| JP | 2010262446 A | 11/2010 | |
| JP | 2014137671 A | 7/2014 | |

* cited by examiner

*Primary Examiner* — Olga V Merkoulova
(74) *Attorney, Agent, or Firm* — Canon U.S.A., Inc. IP Division

(57) ABSTRACT

In a case where an input field is selected, an information processing apparatus determines whether a remote operation is being performed, and based on a state of the remote operation, the information processing apparatus displays or hides a software keyboard of the information processing apparatus.

21 Claims, 14 Drawing Sheets

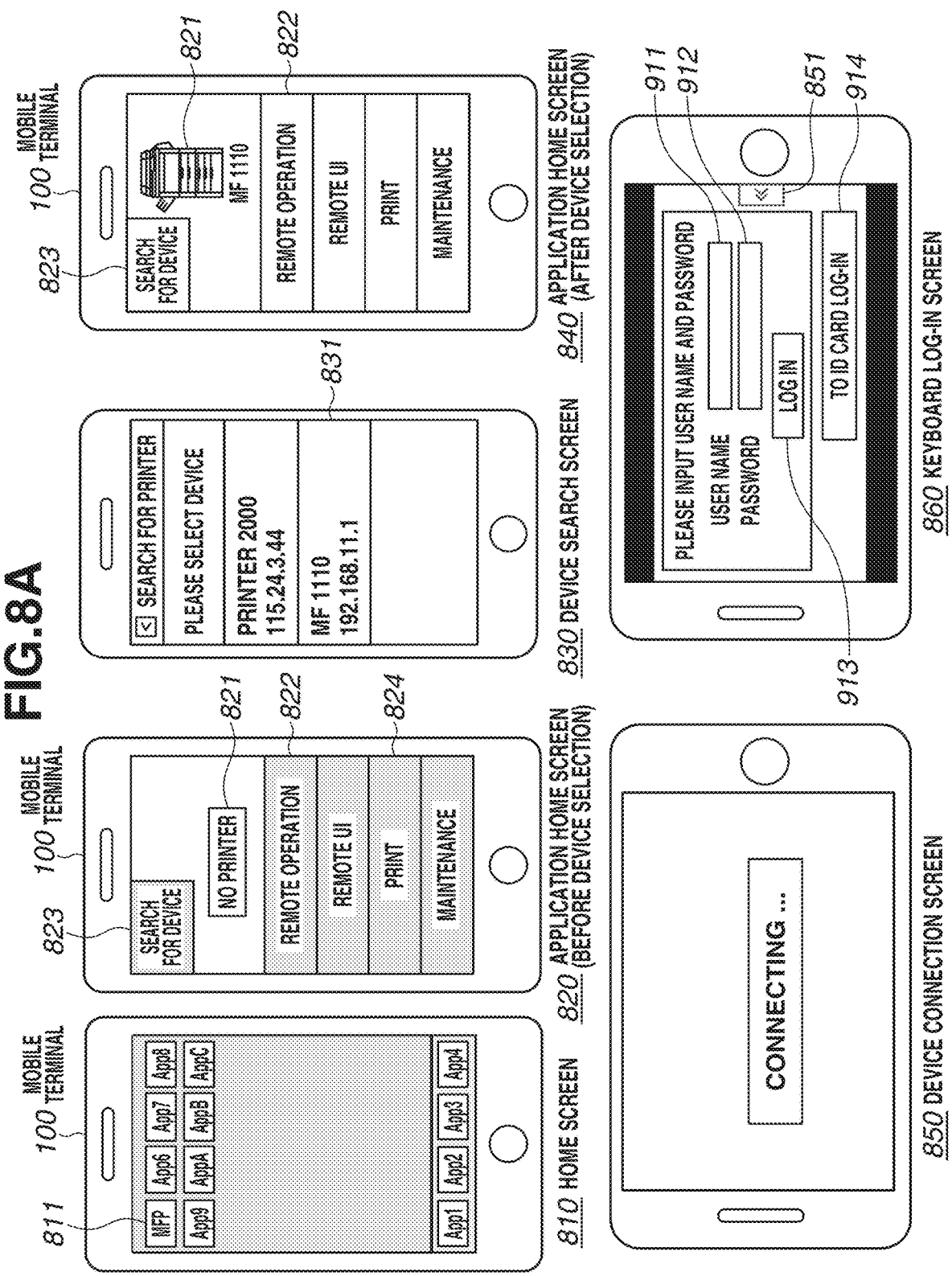

FIG.8B
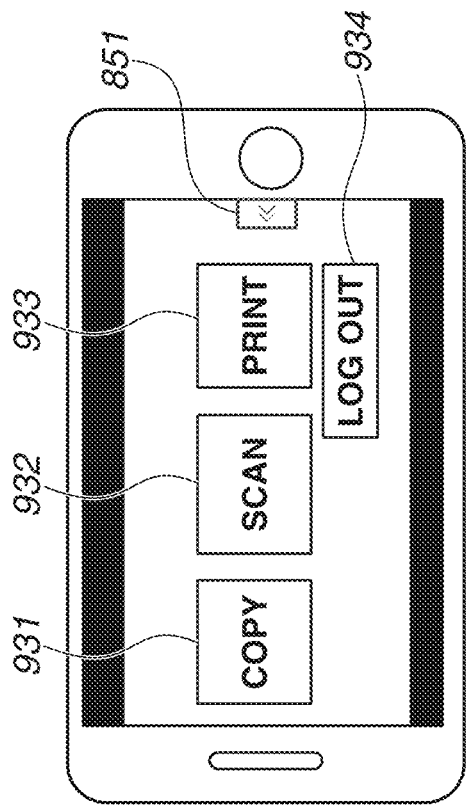
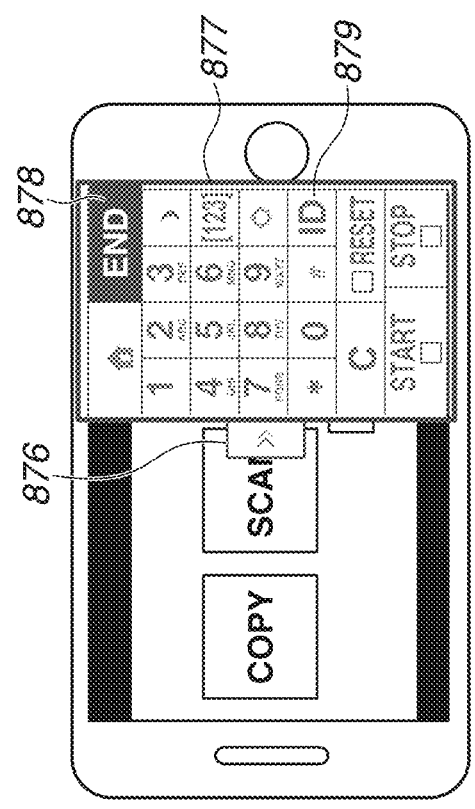
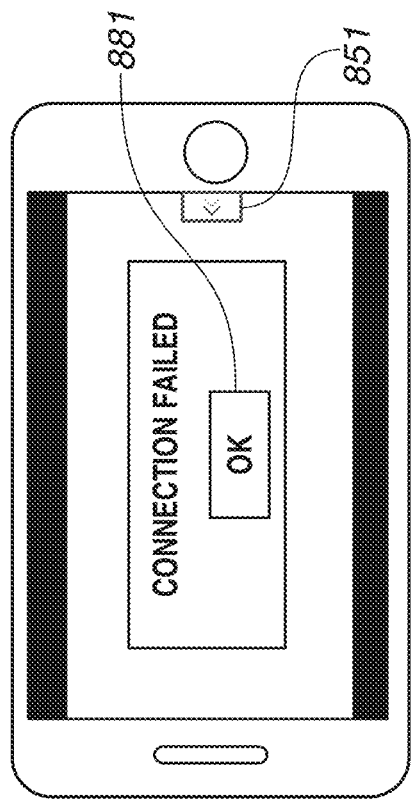

FIG.9
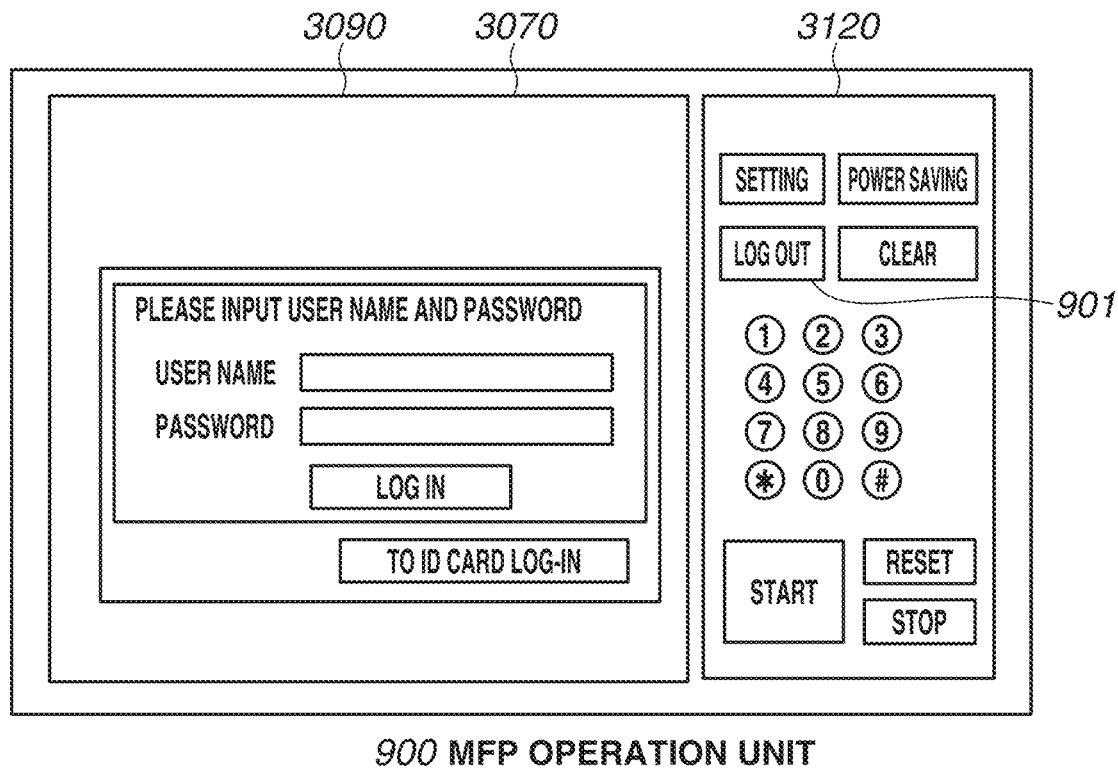
900 MFP OPERATION UNIT
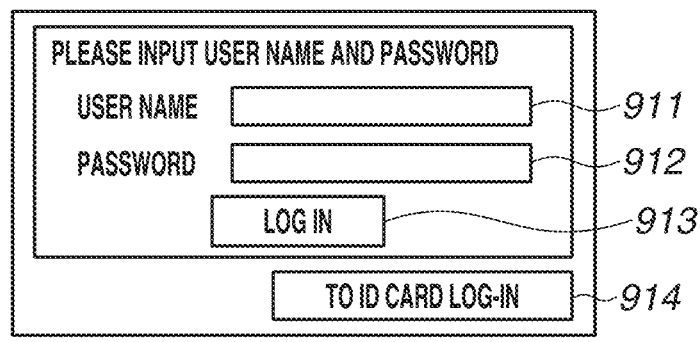
910 KEYBOARD LOG-IN SCREEN
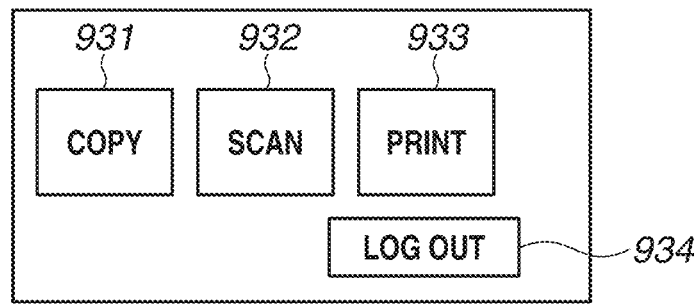
930 MENU SCREEN

FIG.10
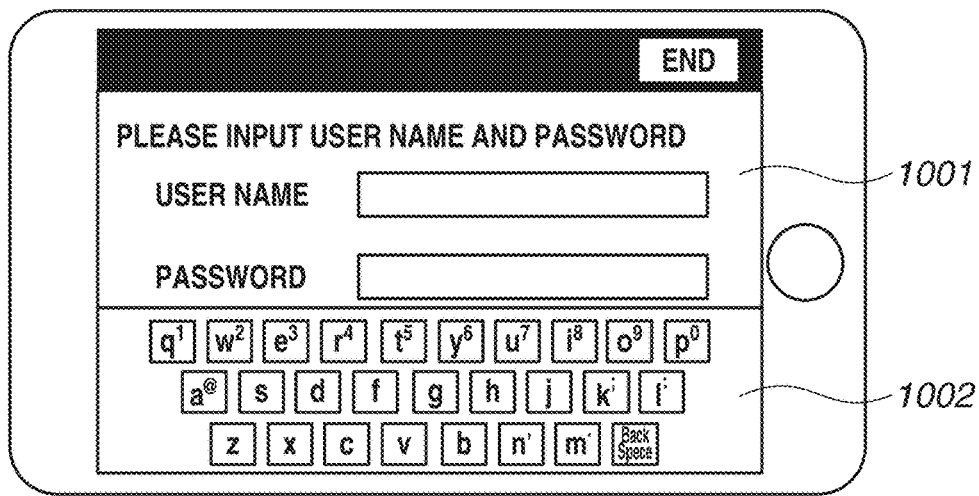
1000 LOG-IN INITIAL SCREEN
(SOFTWARE KEYBOARD OF MOBILE TERMINAL)
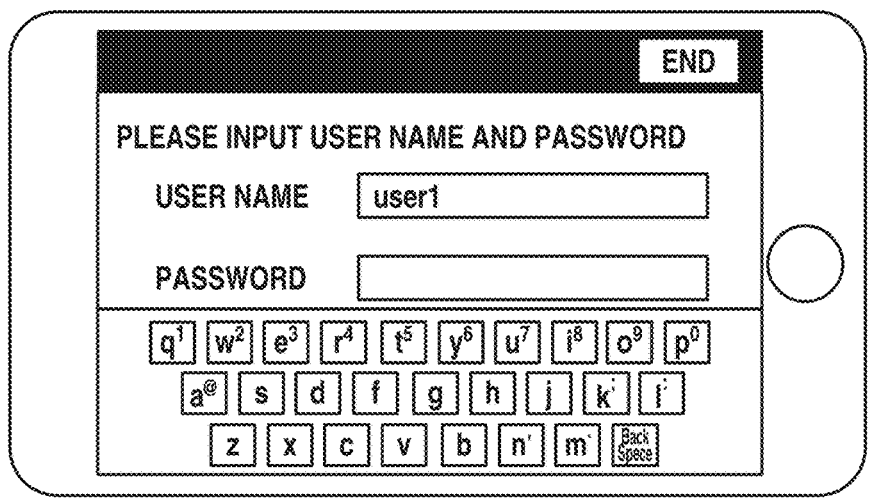
1020 INPUT-STATE LOG-IN SCREEN
(SOFTWARE KEYBOARD OF MOBILE TERMINAL)
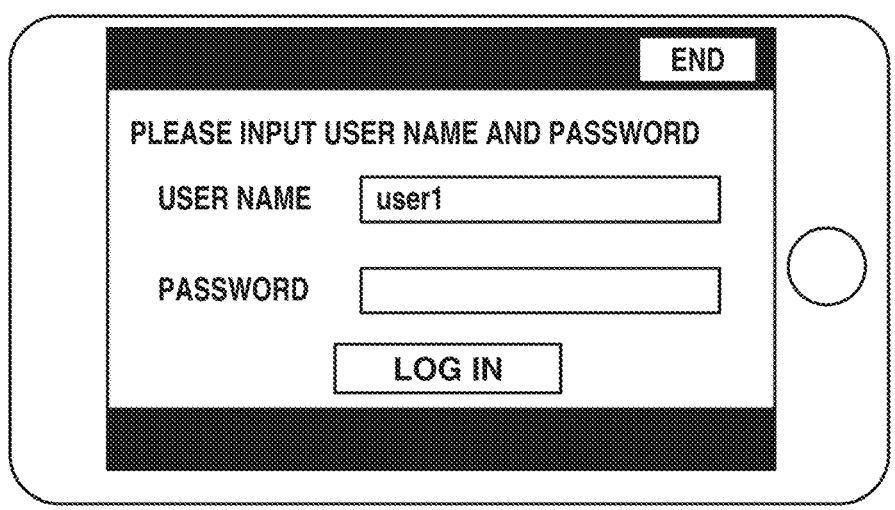
1030 LOG-IN SCREEN (AFTER INPUT)

FIG.11

USER NAME

[ _____ ]

| 1 | 2 | 3 | 4 | 5 | 6 | 7 | 8 | 9 | 0 | - | Back Space |
| q | w | e | r | t | y | u | i | o | p | @ | |
| a | s | d | f | g | h | j | k | l | ; | : | |
| z | x | c | v | b | n | m | , | . | | | |

[ CANCEL ]                    [ OK ]

*1110* TEXT INPUT SCREEN (INITIAL SCREEN)

---

USER NAME

[ user1 ]

| 1 | 2 | 3 | 4 | 5 | 6 | 7 | 8 | 9 | 0 | - | Back Space |
| q | w | e | r | t | y | u | i | o | p | @ | |
| a | s | d | f | g | h | j | k | l | ; | : | |
| z | x | c | v | b | n | m | , | . | | | |

[ CANCEL ]                    [ OK ]  —1121

*1120* INPUT-STATE TEXT INPUT SCREEN

---

PLEASE INPUT USER NAME AND PASSWORD

USER NAME    [ user1 ]

PASSWORD    [ _____ ]

[ LOG IN ]

*1130* POST-INPUT LOG-IN SCREEN

FIG.13
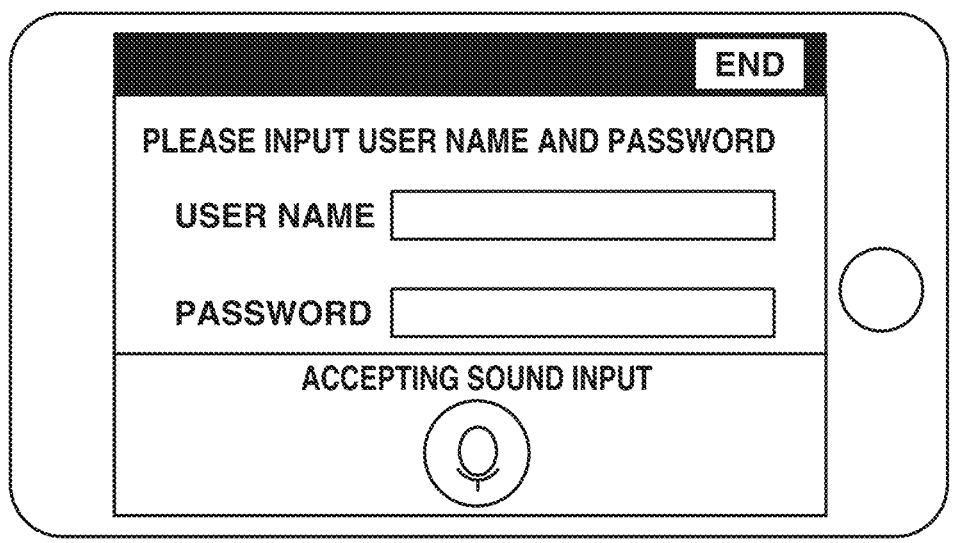
1300  LOG-IN INITIAL SCREEN
(WHEN MOBILE TERMINAL ACCEPTS SOUND INPUT)
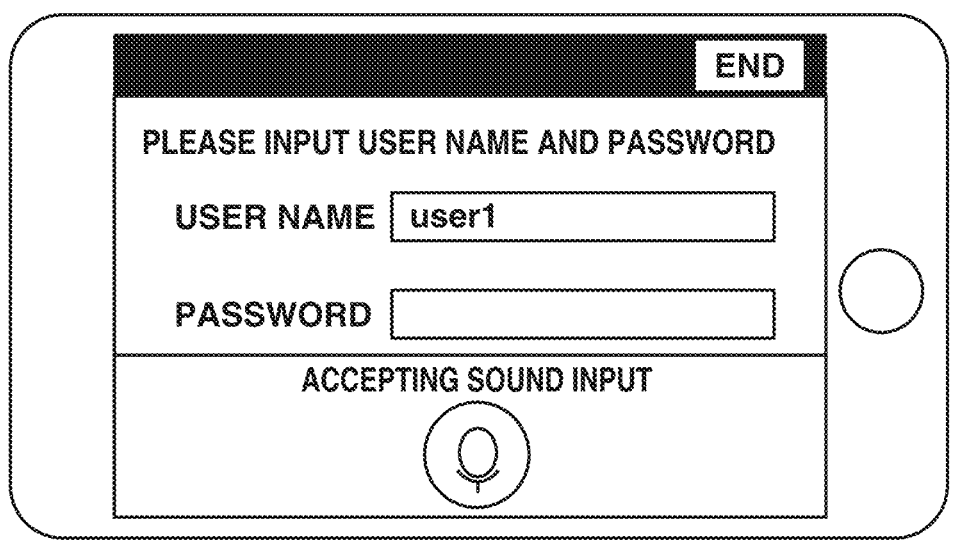
1320  INPUT-STATE LOG-IN SCREEN
(WHEN MOBILE TERMINAL ACCEPTS SOUND INPUT)

INFORMATION PROCESSING APPARATUS AND CONTROL METHOD OF SUCH AN INFORMATION PROCESSING APPARATUS

BACKGROUND OF THE INVENTION

Field of the Invention

The present invention relates to a method for displaying an operation screen of an information processing apparatus on a remote client and a control method of such an information processing apparatus.

Description of the Related Art

A method for utilizing a system called "Virtual Network Computing (VNC)" using a remote framebuffer (RFB) protocol to operate an operation screen of an information processing apparatus has been discussed to remotely operate operation screens of information processing apparatuses. Specifically, an information processing apparatus having a VNC server function transmits screen information of a screen being displayed on an operation panel of the information processing apparatus to a terminal having a VNC client function. Based on the received screen information, the terminal displays the same screen (remote operation screen) that the operation panel of the information processing apparatus displays, on an operation panel of the terminal. Then, based on an operation performed on the screen on the operation panel of the terminal, the terminal transmits information on the operation to the information processing apparatus to remotely operate the information processing apparatus.

For example, Japanese Patent Application Laid-Open Publication No. 2014-137671 discusses a method for inputting a character in remote operation of a screen of an information processing apparatus from a mobile terminal. According to the method discussed in Japanese Patent Application Laid-Open Publication No. 2014-137671, in response to acceptance of an instruction for inputting a character in the remote operation of the screen of the information processing apparatus from the mobile terminal, a software keyboard of the mobile terminal is displayed on the remote operation screen. With the above-described method, inputting a character to the information processing apparatus can be performed by using the software keyboard of the mobile terminal.

However, displaying the software keyboard of the mobile terminal on the mobile terminal remotely operating the screen of the information processing apparatus by using the conventional method may impair usability.

In a case where an information processing apparatus that displays its own software keyboard in response to acceptance of an instruction for inputting a character is remotely operated from a mobile terminal, the information processing apparatus displays its own software keyboard and the mobile terminal also displays its own software keyboard in response to the acceptance of the instruction for inputting a character via a remote operation screen. Consequently, two software keyboards are displayed on the remote operation screen. If this happens, visibility will be degraded and operability will be lowered because setting items are hidden behind the software keyboards. This issue is not solved in the method discussed in Japanese Patent Application Laid-Open Publication No. 2014-137671. Further, because a software keyboard of a mobile terminal is designed for performing a character input operation on the mobile terminal, it is desirable for the user to input a character by using the software keyboard of the mobile terminal as long as the user performs a character input operation on the mobile terminal even during a remote operation of the information processing apparatus.

SUMMARY OF THE INVENTION

In consideration of the above-described situation, the present invention is directed to a method for preventing lowering operability in a character input operation using a software keyboard of a mobile terminal remotely operating a screen of an information processing apparatus that displays a software keyboard of the information processing apparatus in response to acceptance of an instruction for inputting a character.

According to an aspect of the present invention, an information processing apparatus that has a first display unit and is configured to display a first software keyboard on the first display unit based on acceptance of a selection operation of a character-input item on a screen being displayed on the first display unit, wherein the information processing apparatus includes a memory, and at least one processor in communication with the memory, wherein the at least one processor of the information processing apparatus is configured to perform transmitting screen information corresponding to an updated screen to a terminal each time when the screen being displayed on the first display unit is updated, wherein, based on acceptance of a selection operation of the character-input item on a screen that is displayed on a second display unit of the terminal based on the transmitted screen information, and receipt of information about the selection operation from the terminal, the information processing apparatus transmits an instruction for displaying a second software keyboard of the terminal on the second display unit and controls the first display unit so as not to display the first software keyboard.

Further features of the present invention will become apparent from the following description of embodiments with reference to the attached drawings.

BRIEF DESCRIPTION OF THE DRAWINGS

FIGS. 8A and 8B are diagrams illustrating examples of user interfaces (UIs) that are displayed on an operation panel of the mobile terminal according to the present embodiment.

FIG. 9 is a diagram illustrating UIs that are displayed on an operation panel of the information processing apparatus according to the present embodiment.

FIG. 10 is a diagram illustrating UIs that are displayed on the operation panel of the mobile terminal according to the present embodiment.

FIG. 11 is a diagram illustrating UIs that are displayed on the operation panel of the information processing apparatus according to the present embodiment.

FIG. 13 is a diagram illustrating a UI displayed on the operation panel of the mobile terminal according to the present embodiment.

DESCRIPTION OF THE EMBODIMENTS

Hereinafter, preferred embodiments embodying the present invention will be described with reference to the appended drawings. The present invention is not limited to the embodiments described below, and not all of the features described in the embodiments need to be combined to implement the present invention.

<System Configuration according to the Present>

Figure 1:
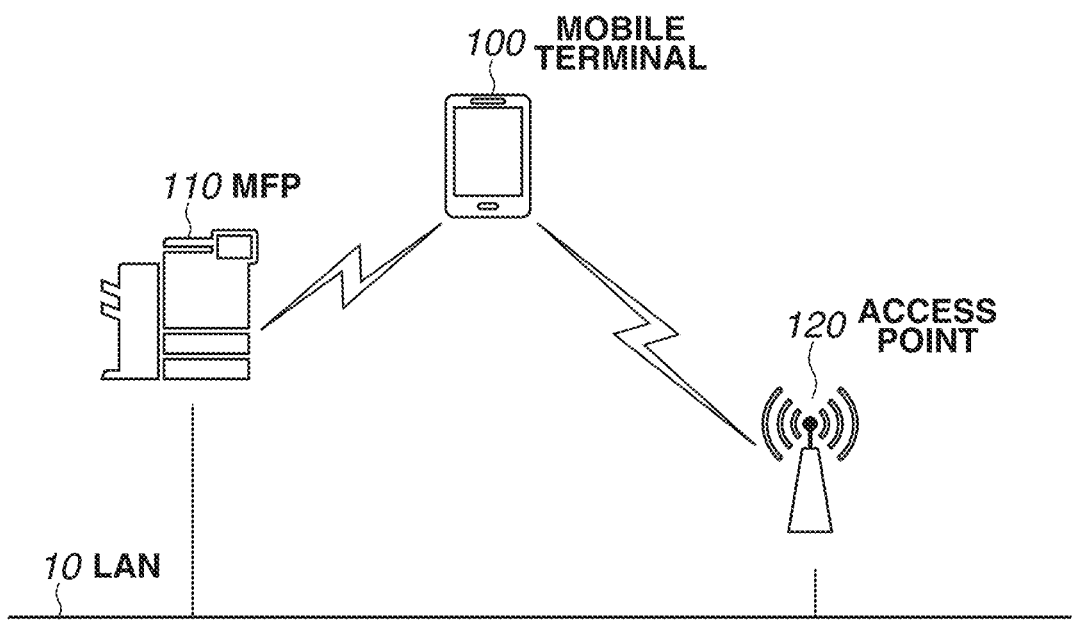
FIG. 1 is a diagram illustrating a configuration of an information communication system.

First, a system configuration according to a first embodiment will be described with reference to FIG. 1. Herein, a mobile terminal 100 and a multifunction peripheral (MFP) 110 are described as examples of the information processing apparatuses. However, the apparatuses included in the information processing system are not limited thereto.

The mobile terminal 100 and the MFP 110 are connected to a local area network (LAN) 10, and can exchange information with each other. The mobile terminal 100 is connected to the LAN 10 via an access point 120.

The mobile terminal 100 has a virtual network computing (VNC) client function for remotely operating the MFP 110. Specifically, the mobile terminal 100 includes VNC client software compliant with the remote frame buffer (RFB) protocol. The mobile terminal 100 connects to the MFP 110 by using the VNC and displays a screen displayed on the operation panel of the MFP 110 on the mobile terminal 100. The MFP 110 has a VNC server function, and transmits screen information to the mobile terminal 100 operating as a VNC client, in response to the mobile terminal 100 connecting to the MFP 110 by using the VNC. The mobile terminal 100 renders a screen based on the transmitted screen information. A screen on the mobile terminal 100 and a screen on a display unit of the MFP 110 are synchronized with each other, so that both of the screens are changed according to an operation accepted via the rendered screen or by the MFP 110.

Figure 2:
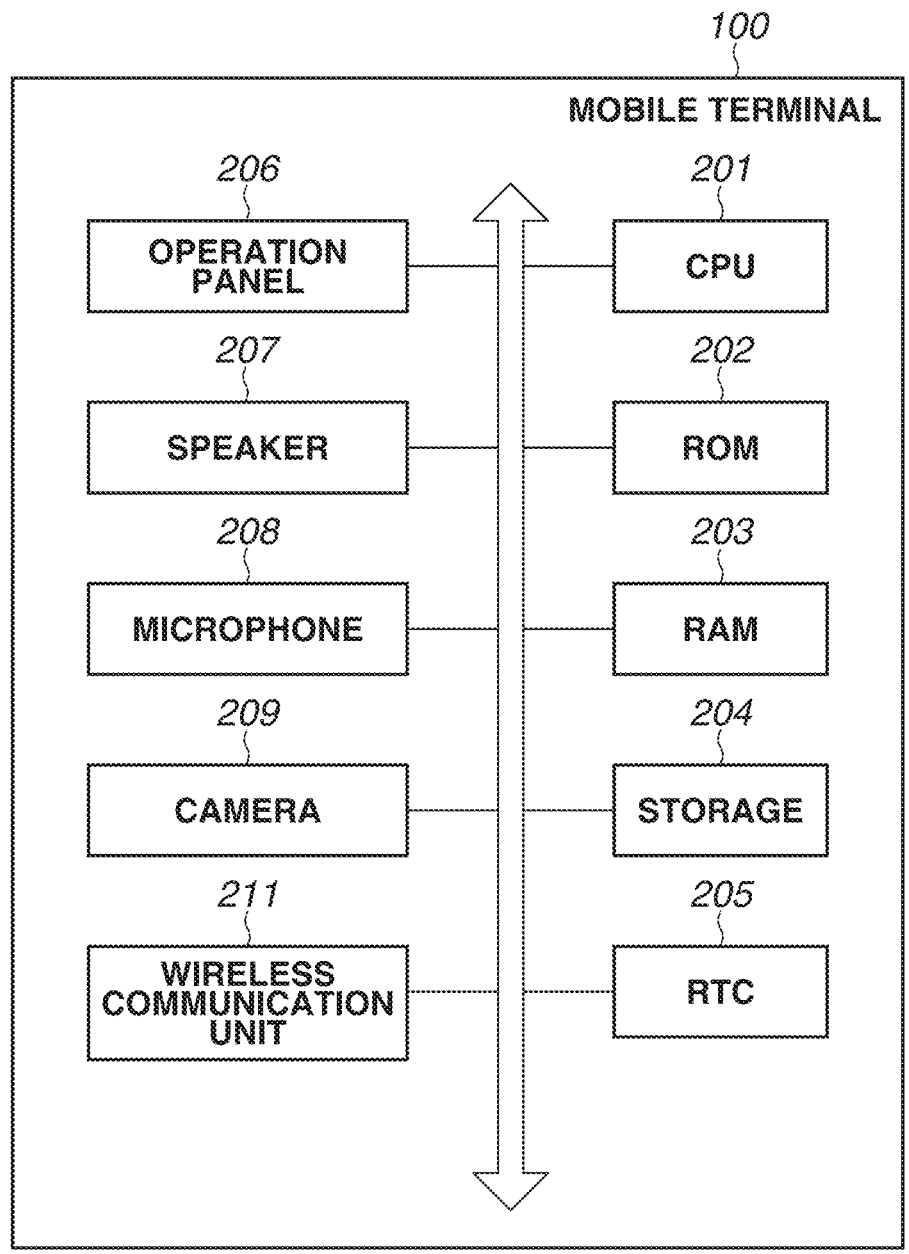
FIG. 2 is a block diagram illustrating a hardware configuration of a mobile terminal.

A hardware configuration of the mobile terminal 100 will be described with reference to FIG. 2. While, in the present embodiment, the mobile terminal 100 is an apparatus such as a smartphone or a tablet-type personal computer (PC), the mobile terminal 100 can be an information processing apparatus of another type capable of communicating with the MFP 110.

A central processing unit (CPU) 201 reads a control program stored in a read only memory (ROM) 202 and executes various types of processing for controlling operation of the mobile terminal 100. The ROM 202 stores a control program. A random access memory (RAM) 203 is used as a main memory or a temporary storage area, such as a work area of the CPU 201. For example, an embedded multimedia card (eMMC), a solid state drive (SSD), or a hard disk drive (HDD) is used as a storage 204 for storing various types of data, such as photographs and electronic documents. An operating system (OS) 350 and an MFP application 300 described below are also stored in the storage 204. A real time clock (RTC) 205 measures time.

While, in the present embodiment, a description will be provided of a case of using the mobile terminal 100 and processing procedures of the below-described flowcharts are executed by a single CPU 201, the present embodiment is not limited thereto. For example, processing procedures illustrated in the below-described flowcharts can be executed by a plurality of CPUs cooperatively.

The operation panel 206 has a touch panel function for detecting a touch operation performed by the user, and displays various screens provided by the OS 350 and the MFP application 300. The user can input a desired operation instruction to the mobile terminal 100 by performing a touch operation on the operation panel 206.

A speaker 207 and a microphone 208 are used, for example, in a case where the user makes a phone call to another mobile terminal or a landline phone. A camera 209 executes image capturing according to an image capturing instruction from the user. Images captured by the camera 209 are stored in a predetermined area of the storage 204. A wireless communication unit 211 executes wireless communication, such as a wireless communication using a LAN.

Figure 3:
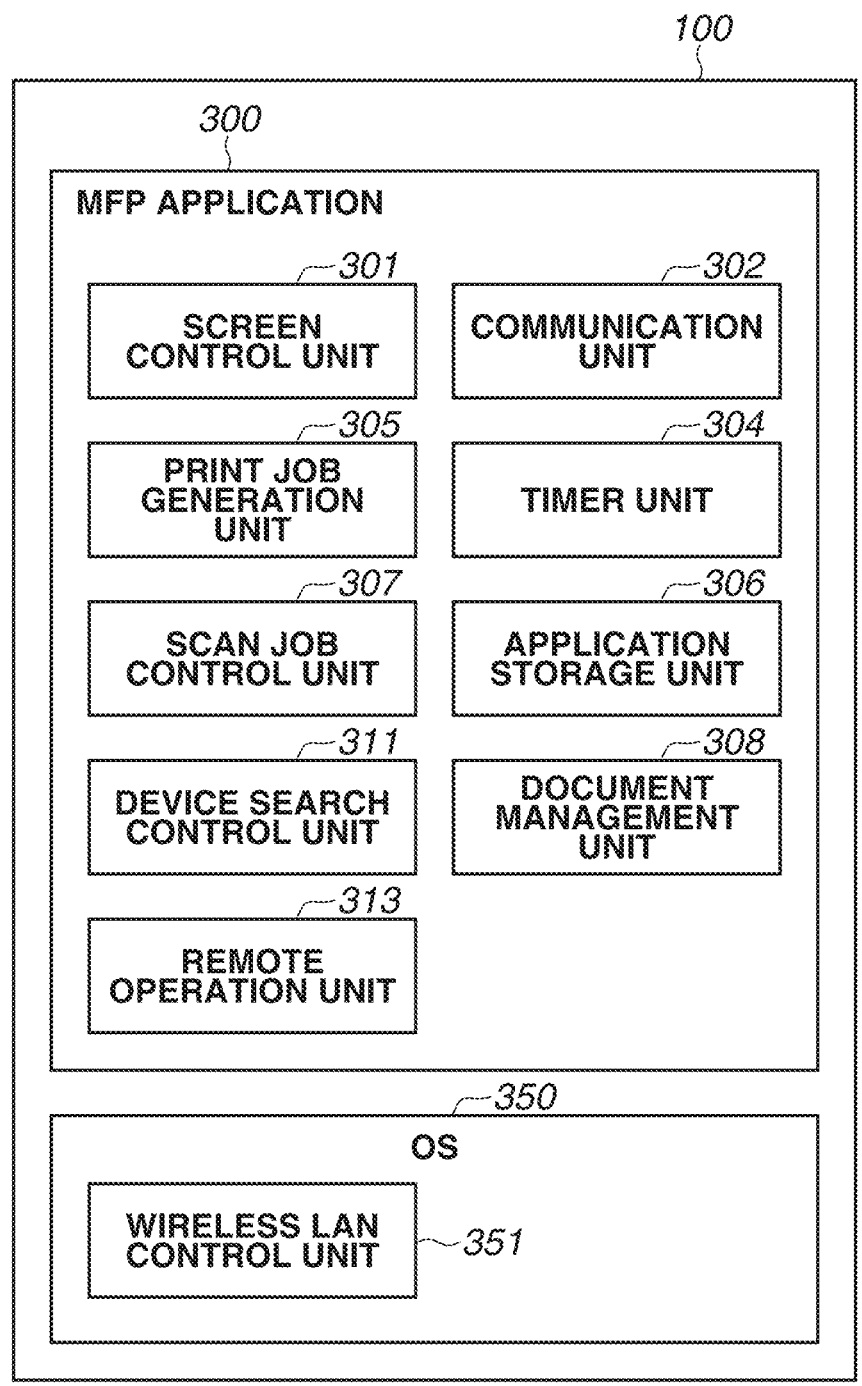
FIG. 3 is a block diagram illustrating a software configuration of the mobile terminal.

A software configuration of the mobile terminal 100 will be described with reference to FIG. 3. FIG. 3 is a block diagram illustrating software functions realized by the CPU 201 by reading a control program stored in the ROM 202 or the storage 204.

The OS 350 is software for controlling a general operation of the mobile terminal 100. Various applications including the MFP application 300 described below can be installed in the mobile terminal 100. The OS 350 exchanges information with these applications and changes a screen displayed on the operation panel 206 according to instructions received from the applications. The OS 350 includes a group of device drivers for controlling various types of hardware, and provides an application programming interface (API) which allows the applications operating on the OS 350 to use the various types of hardware. In the present embodiment, for example, a wireless LAN control unit 351 corresponds to a device driver. The wireless LAN control unit 351 is a device driver for controlling the wireless communication unit 211.

The MFP application 300 is an application installed in the mobile terminal 100. The MFP application 300 can issue a printing instruction and a scanning instruction to the MFP 110. Further, as described above, the MFP application 300 has a function for operating as a VNC client, displaying an operation screen of the MFP 110, and remotely operating the MFP 110. Although various applications may be installed in the mobile terminal 100 in addition to the MFP application 300, descriptions thereof will be omitted.

A configuration of the MFP application 300 will be described further in detail. A screen control unit 301 controls a screen that is displayed on the operation panel 206, via the OS 350. The screen control unit 301 displays a screen of the MFP application 300 on the operation panel 206. Further, the screen control unit 301 accepts an operation instruction input by the user via the operation panel 206. A communication unit 302 controls wireless communication executed by the wireless communication unit 211 via the OS 350, and transmits and receives information to/from an external apparatus, such as the MFP 110.

A device search control unit 311 generates search data to be used for searching for an external apparatus to which the mobile terminal 100 connects, and the wireless communication unit 211 transmits the search data to an apparatus on the LAN 10. Then, the device search control unit 311 receives a response from an external apparatus responding to the search. The search data may be broadcasted to all external apparatuses on the LAN 10, or may be transmitted to one external apparatus by specifying an address of the one external apparatus.

A print job generation unit 305 generates a print job. The print job generated by the print job generation unit 305 is transmitted to the MFP 110 by the wireless communication unit 211, and the MFP 110 executes printing according to the received print job.

A scan job control unit 307 transmits a scanning instruction to the MFP 110 via the wireless communication unit 211. The MFP 110 executes scanning based on the instruction, and transmits data (scan data) generated by the scanning to the mobile terminal 100. The mobile terminal 100 displays the received scan data. In a case where the scan data is saved, the scan data is stored in an application storage unit 306. The stored scan data is managed by a document management unit 308.

A remote operation unit 313 displays a screen based on the screen information acquired from the MFP 110 to which the mobile terminal 100 connects using the VNC, and accepts an operation performed on the displayed screen. In other words, the remote operation unit 313 operates as a VNC client. Specifically, the remote operation unit 313 displays a screen based on the screen information received from the VNC server and transmits operation information to the MFP 110. The operation information includes an operation accepted position on the displayed screen, a type of the operation, and the like.

Based on the received operation information, the MFP 110 changes a screen displayed on the MFP 110 and the screen displayed on the mobile terminal 100. The application storage unit 306 temporarily stores various types of information generated by the MFP application 300. A timer unit 304 measures time.

Figure 4:
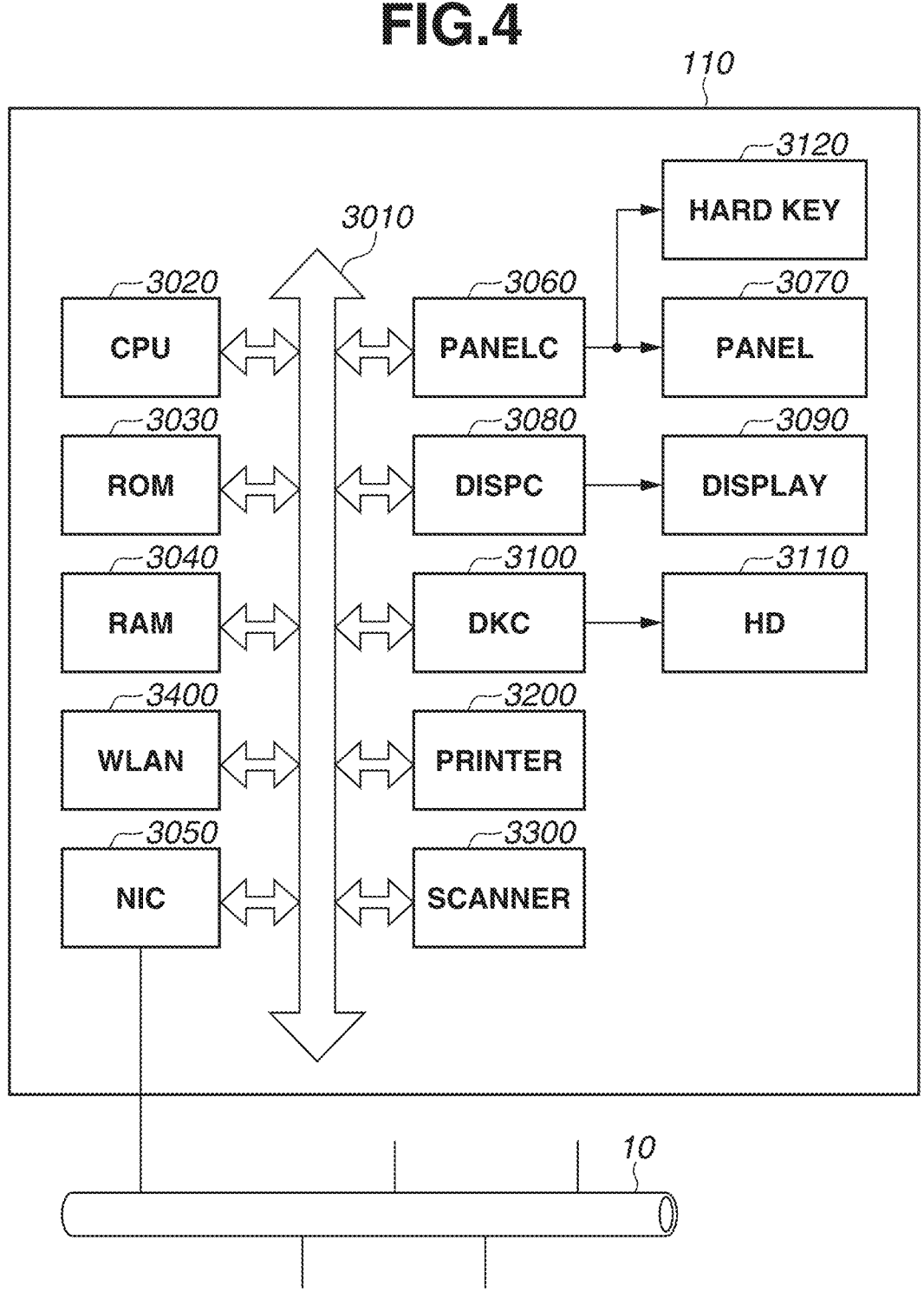
FIG. 4 is a block diagram illustrating a hardware configuration of an information processing apparatus.

FIG. 4 is a block diagram illustrating an example of a hardware configuration of the MFP 110. The MFP 110 includes a CPU 3020 which executes a program stored in a ROM 3030 or a storage device (HD) 3110 of a hard disc drive having a large storage capacity, and the CPU 3020 generally controls devices connected to a system bus 3010.

A RAM 3040 functions as a main memory or a work area of the CPU 3020. An external input controller (PANELC) 3060 executes input control of an instruction input via a hard key 3120 having various types of keys or a touch panel (PANEL) 3070 arranged on the MFP 110. A display controller (DISPC) 3080 executes display control of a display module (DISPLAY) 3090 configured of a liquid crystal display. A disc controller (DKC) 3100 controls a storage device (HD) 3110 having a large capacity.

An operation unit of the MFP 110 will be described with reference to an MFP operation unit 900 in FIG. 9. A screen is displayed on the DISPLAY 3090, and the hard key 3120 is arranged next to the DISPLAY 3090. A user operation can be accepted by both of the touch panel 3070 arranged on top of the DISPLAY 3090 and the hard key 3120. An instruction for executing log-out processing is issued to the MFP 110 when a log-out key 901 functioning as one of the hard key 3120 is pressed in a state where the user is logging in the MFP 110.

A network interface card (NIC) 3050 transmits and receives data to/from an external device (e.g., mobile terminal 100) or a file server via the LAN 10. A wireless communication module (WLAN) 3400 causes the MFP 110 to connect to an access point or to operate as an access point by operating in an access point mode to directly connect to the mobile terminal 100 through wireless communication. A printer 3200 is a printing unit for electro-photographic printing on a sheet. A printing method is not limited to the electro-photographic method. A scanner 3300 is an image reading unit for reading an image printed on a sheet. In many cases, an auto-document feeder (ADF) (not illustrated) is mounted on the scanner 3300, and thus a plurality of documents can be read automatically. In some cases, the storage device 3110 having a large capacity is also used as a temporary storage area for storing images.

Figure 5:
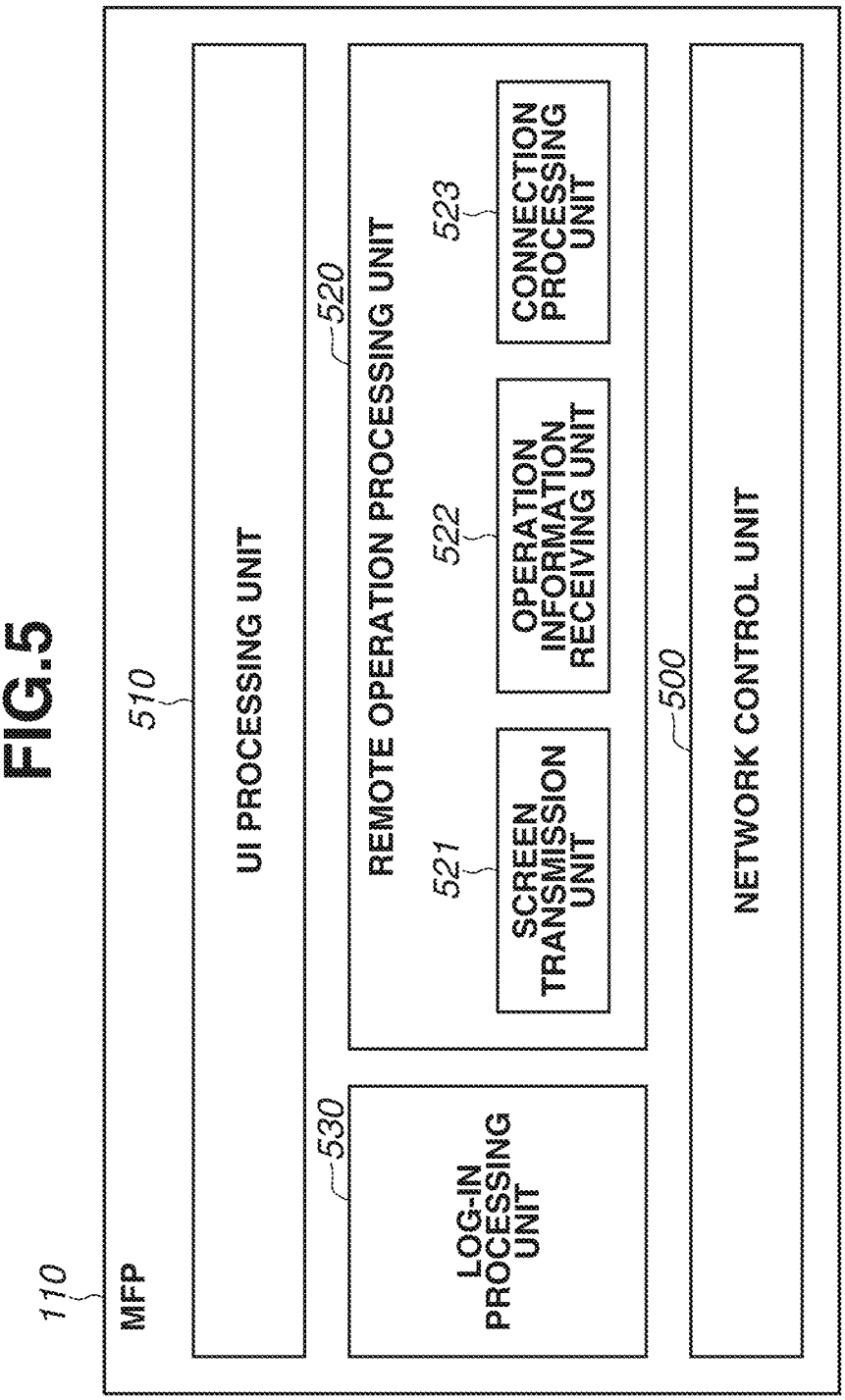
FIG. 5 is a block diagram illustrating a software configuration of the information processing apparatus.

FIG. 5 is a block diagram illustrating a software configuration of the MFP 110. For example, the software is stored in the ROM 3030 and executed by the CPU 3020.

A user interface (UI) processing unit 510 analyzes data received from the external input controller 3060 or operation information received from an operation information receiving unit 522 described below, and generates screen data and displays a screen on the DISPLAY 3090 in a case where the screen is changed.

As illustrated in FIG. 9, various screens are displayed on the DISPLAY 3090. For example, a keyboard log-in screen 910, a menu screen 930 that is displayed when the user is logging in, an error screen (not illustrated) that is displayed when an error occurs, and a counter screen (not illustrated) for displaying page counter information are displayed on the DISPLAY 3090. The DISPLAY 3090 is preferably turned off when the MFP 110 is in a sleep state.

The keyboard log-in screen 910 is a screen through which the user logs in the MFP 110 by inputting user information with a keyboard. Log-in processing is executed when the user inputs information to a user name input field 911 and a password input field 912 by using the hard key 3120 or a software keyboard (described below) and presses a log-in button 913. A role is allocated to each user, and a scope of authorized functions varies according to a logged-in user. Because the MFP 110 is a multifunction peripheral having a plurality of functions including at least a printing function, available functions may vary according to a logged-in user. When an ID card log-in selection button 914 is pressed, a displayed screen is changed to an ID card log-in screen (not illustrated).

The menu screen 930 is displayed after the user has logged in the MFP 110 via the keyboard log-in screen 910 or the ID card log-in screen. The user can use various functions of the MFP 110 by pressing a copy button 931, a scan button 932, or a print button 933 based on a purpose of use. Log-out processing is executed when a log-out button 934 is pressed.

A remote operation processing unit 520 includes modules of a connection processing unit 523, the operation information receiving unit 522, and a screen transmission unit 521. The remote operation processing unit 520 serves as a VNC server module for executing communication compliant with the RFB protocol, and also serves as a software module for communicating with the mobile terminal 100 operating as a VNC client via the network. The connection processing unit 523 executes connection processing in a case where a connection request from the MFP 110 or the mobile terminal 100 operating as a VNC client is accepted, and executes disconnection processing in a case where a disconnection request is accepted.

The operation information receiving unit 522 receives operation information of a screen from the mobile terminal 100 and the MFP 110, and transmits the received operation information to the UI processing unit 510. The screen transmission unit 521 is a display control unit that executes display control of a screen by reading screen data generated by the UI processing unit 510 and transmitting the screen data to the mobile terminal 100 operating as a VNC client.

A log-in processing unit 530 is a module for executing log-in processing of the MFP 110. Based on the user information received from the UI processing unit 510, the log-in processing unit 530 executes user authentication and allows the user to log in in a case where the user authentication has succeeded. The log-in processing unit 530 also executes log-out processing in a case where a log-out instruction is transmitted from the UI processing unit 510. A network control unit 500 is a module for controlling the NIC 3050. Further, a printer module for controlling the printer 3200 and a scanner module for controlling the scanner 3300 are also provided although they are not illustrated.

FIGS. 8A and 8B are diagrams illustrating examples of screens each displayed on the operation panel 206 of the mobile terminal 100. A home screen 810 is displayed after activation of the mobile terminal 100. An MFP application icon 811 is an icon for activating the MFP application 300. The MFP application 300 is activated in response to an operation performed on the MFP application icon 811.

In a case where the MFP application 300 is activated, an application home screen (before device selection) 820 is displayed. A selected device icon 821 indicates information about an MFP currently communicating with the MFP application 300 or information about an MFP as a transmission target of a job (hereinafter, called "target MFP"). In a case where a target MFP is not selected, an icon "No Printer" is displayed. A device search button 823 is a button for searching for a target MFP. A remote operation button 822 is a button for remotely operating a target MFP by connecting the mobile terminal 100 to the target MFP using the VNC. In addition to the buttons described above, a print button 824 for transmitting a print job to the target MFP and a button for inputting a scanning instruction may be displayed on the application home screen 820.

When the device search button 823 is pressed, search of MFPs existing in the network is executed, and a device search screen 830 is displayed as a result of the search. A list of MFPs responding to the search is displayed on the device search screen 830. For example, a target MFP is selected when a search result 831 is selected from the search results.

An application home screen (after device selection) 840 is displayed in a case where a target MFP is selected. The selected device icon 821 displays information about the MFP selected from the device search screen 830. In a case where the user taps the remote operation button 822 in a state where the target MFP is selected, a remote operation function for remotely operating the target MFP is started. Hereinafter, the present embodiment will be described by taking the MFP 110 as an example of the selected target MFP.

In a case where the remote operation function is started, a device connection screen 850 is displayed. After the mobile terminal 100 is connected to the MFP 110 using the VNC to establish the remote operation function, a screen displayed on the DISPLAY 3090 of the MFP 110 is displayed on the operation panel 206. Herein, the same screen as the keyboard log-in screen 910, i.e., a keyboard log-in screen 860, is displayed. Contents of the keyboard log-in screen 860 are the same as the contents of the keyboard log-in screen 910, and thus descriptions thereof will be omitted. Further, in a case where the ID card log-in screen is displayed on the MFP 110, the ID card log-in screen is displayed on the operation panel 206.

When a log-in instruction is input via the keyboard log-in screen 860, a menu display screen (without hard keys) 870 which is the same as the menu screen 930 is displayed, and the menu screen 930 is also displayed on the DISPLAY 3090.

In a case where a hard key display button 851 is tapped, a menu display screen (with hard keys) 875 is displayed. In other words, a software keyboard to which processes corresponding to respective keys of the hard key 3120 of the MFP 110 are allocated is displayed. A hard key UI 877 is a UI for operating the hard key 3120 of the MFP 110. In a case where a button displayed on the hard key UI 877 is tapped, information about the pressed key is transmitted to the MFP 110, and the MFP 110 executes processing based on the pressed key. When a log-out button 879 corresponding to a log-out key 901 of the MFP 110 is pressed, the user logs out from the MFP 110. A close button 876 is used to hide the hard key UI 877. Further, in a case where an end button 878 displayed on the hard key UI 877 is tapped, the mobile terminal 100 ends the remote operation function, i.e., VNC connection. In a case where the VNC connection is ended, the application home screen (after device selection) 840 is displayed on the operation panel 206.

A general outline of the present embodiment will be described with reference to FIGS. 10 and 11. In a case where a character input field is touched (e.g., user name input field 911) on the DISPLAY 3090 in a state where the keyboard log-in screen 910 is displayed on the MFP 110, a software keyboard of the MFP 110 is displayed on the DISPLAY 3090. In other words, a text input screen 1110 is displayed on the DISPLAY 3090.

Herein, a description will be provided of a case where the same screen as the screen displayed on the DISPLAY 3090 of the MFP 110 is displayed on the operation panel 206 of the mobile terminal 100, and the MFP 110 is remotely operated from the mobile terminal 100. For example, in a case where the user name input field 911 displayed on the operation panel 206 is touched in a state where the keyboard log-in screen 860 is displayed on the mobile terminal 100 (at this time, the keyboard log-in screen 910 is displayed on the MFP 110), operation information is transmitted to the MFP 110, and the MFP 110 executes processing according to the operation information. At this time, the MFP 110 instructs the mobile terminal 100 to display the software keyboard of the mobile terminal 100, and does not display a software keyboard of the MFP 110 on the DISPLAY 3090. Then, the MFP 110 executes control for preventing screen information of a screen displaying the software keyboard of the MFP 110 from being transmitted to the mobile terminal 100. As a result, the mobile terminal 100 displays a log-in initial screen 1000 which includes a software keyboard 1002 of the mobile terminal 100 and a screen 1001 which is the same screen as the screen displayed on the DISPLAY 3090, and the MFP 110 keeps displaying the keyboard log-in screen 910. At this time, if the MFP 110 displays the software keyboard of the MFP 110 on the DISPLAY 3090 in response to the touch operation on the user name input field 911, two software keyboards, i.e., the software keyboard of the MFP 110 and the software keyboard of the mobile terminal 100, are displayed on the operation panel 206 of the mobile terminal 100, which may lower visibility and operability. For example, if a screen displayed on the DISPLAY 3090 is changed to a screen which displays a software keyboard, i.e., the text input screen 1110, from the keyboard log-in screen 910, the password input field 912 displayed on the keyboard log-in screen 910 is not displayed on the text input screen 1110. In order to prevent lowering of visibility and operability, during the remote operation, the MFP 110 neither displays the software keyboard of the MFP 110 nor transmits information of a screen displaying the software keyboard of the MFP 110 even if a character input field (e.g., user name input field 911) is selected. Herein, the software keyboard 1002 of the mobile terminal 100 may be a software keyboard commonly used for a plurality of applications operating on the mobile terminal 100, or may be a software keyboard provided by an operating system of the mobile terminal 100 or a software keyboard specific to the application.

Figure 6:
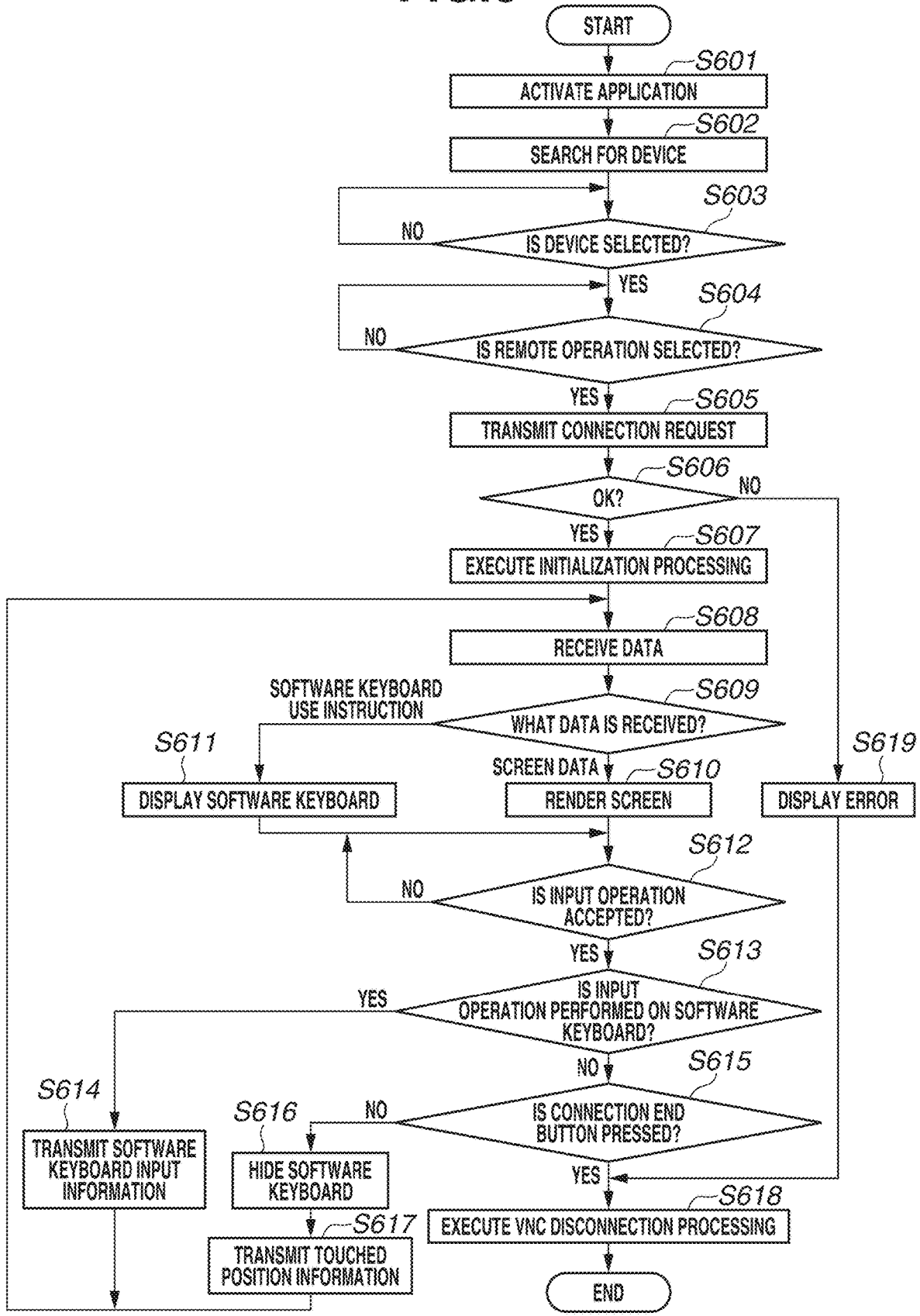
FIG. 6 is a flowchart illustrating processing of the mobile terminal according to a present embodiment.

FIG. 6 is a flowchart illustrating processing for connecting the mobile terminal 100 to the MFP 110 by using the VNC, executing remote operation, and disconnecting communication using the VNC. The CPU 201 loads a control program stored in a memory, such as the ROM 202, to the RAM 203, and executes the control program to process step illustrated in the flowchart in FIG. 6.

In step S601, in a case where a tap executed on the MFP application icon 811 is detected at the home screen 810, the MFP application 300 is activated. In step S602, the MFP application 300 searches for an MFP in response to the screen control unit 301 detecting a tap performed on the device search button 823 displayed on the application home screen (before device selection) 820. In step S603, the MFP application 300 determines whether an MFP is selected on the device search screen 830. In a case where an MFP is selected (YES in step S603), the MFP application 300 shifts the screen to the application home screen (after device selection) 840, and the processing proceeds to step S604. In a case where an MFP is not selected, the processing returns to step S603.

In step S604, the MFP application 300 determines whether the remote operation button 822 is selected on the application home screen (after device selection) 840. In a case where the remote operation button 822 is selected (YES in step S604), the processing proceeds to step S605. In a case where the remote operation button 822 is not selected (NO in step S604), the processing returns to step S604.

In step S605, the MFP application 300 transmits a connection request to the MFP selected in step S604 by using a communication compliant with the RFB protocol. Then, in step S606, the MFP application 300 determines whether the connection request is accepted. In a case where the connection request is accepted (YES in step S606), the processing proceeds to step S607. In a case where the connection request is not accepted (NO in step S606), the processing proceeds to step S619. Acceptance or refusal of the connection request is determined based on response data received as a response to the connection request. In step S619, the screen control unit 301 displays a connection refusal error screen 880, and the processing is ended.

In step S607, initialization processing is executed using the communication compliant with the RFB protocol. In the initialization processing, the remote operation unit 313 transmits VNC client information and receives VNC server information. Terminal type information is included in the VNC client information. The terminal type information is acquired from the OS 350 and stored in the RAM 203. Pieces of information about an OS name, an OS version, and a terminal name are included in the terminal type information. In step S608, the remote operation unit 313 receives data transmitted from the MFP 110 operating as a VNC server.

In step S609, the remote operation unit 313 determines whether the data received in step S608 is screen data. In a case where the received data is screen data ("SCREEN DATA" in step S609), the processing proceeds to step S610. In a case where the received data is information about an instruction for displaying the software keyboard of the mobile terminal 100 ("SOFTWARE KEYBOARD USE INSTRUCTION" in step S609), the processing proceeds to step S611.

In step S610, the screen control unit 301 renders a screen on the operation panel 206 based on the screen data received in step S609. For example, in a case where the keyboard log-in screen 910 is displayed on the DISPLAY 3090, the keyboard log-in screen 860 is displayed on the operation panel 206. Then, the processing proceeds to step S612.

In step S611, the screen control unit 301 displays the software keyboard provided by the mobile terminal 100. For example, in a case where the user name input field 911 is touched in a state where the keyboard log-in screen 910 is displayed on the DISPLAY 3090, the log-in initial screen 1000 is displayed on the operation panel 206. Then, the processing proceeds to step S612.

In step S612, the screen control unit 301 determines whether an input operation executed by the user is accepted via the operation panel 206. In a case where the input operation is accepted (YES in step S612), the processing proceeds to step S613. In a case where an input operation is not accepted (NO in step S612), the processing in step S612 is executed repeatedly.

In step S613, the screen control unit 301 determines whether the input operation is executed on the software keyboard displayed in step S611. In a case where the input operation is executed on the software keyboard (YES in step S613), the processing proceeds to step S614. In a case where the input operation is not executed on the software keyboard (NO in step S613), the processing proceeds to step S615.

In step S614, the screen control unit 301 transmits character input information (ASCII information) corresponding to a character input by using the software keyboard to the MFP 110, and advances the processing to step S608 each time when the information corresponding to one character is transmitted to the MFP 110. For example, in a case where a letter "u" of the software keyboard is pressed, a value "117" is transmitted to the MFP 110, and in a case where a Back Space key is pressed, a value "8" is transmitted. In a case where letters "u", "s", "e", "r", and "1" of the software keyboard displayed on the log-in initial screen 1000 are pressed, an input-state log-in screen 1020 is displayed on the operation panel 206. While, in the present embodiment, character input information is transmitted to the MFP 110 each time when one letter is input, the present embodiment is not limited thereto. The character input information may be transmitted collectively in response to a confirm key being selected after a character string is input. In other words, instead of transmitting the character information each time when one character is input, a plurality of pieces of character information is transmitted in response to the confirm key being pressed.

In step S615, the remote operation unit 313 determines whether the end button 878 is pressed. In a case where the end button 878 is pressed (YES in step S615), the processing proceeds to step S618. In a case where the end button 878 is not pressed (NO in step S615), the processing proceeds to step S616.

In step S616, the software keyboard is hidden if the software keyboard is displayed in step S611. In a case where the user executes a touch operation on the input-state log-in screen 1020 in an area different from the areas of the software keyboard and an end button, a log-in screen (after input) 1030 is displayed on the operation panel 206.

In step S617, the remote operation unit 313 transmits touched position information to the MFP 110. Then, the processing returns to step S608.

In step S618, the remote operation unit 313 executes VNC disconnection processing and ends the processing.

With the above-described processing illustrated in the flowchart, the mobile terminal 100 can display a screen based on the screen information transmitted from the MFP 110 and remotely operates the MFP 110. Further, the software keyboard of the mobile terminal 100 is displayed in a case where a character input operation is executed in a state where the MFP 110 is operated remotely. Thus, the user can input a character to the MFP 110 via the mobile terminal 100 by using the software keyboard familiar to the user. In the present embodiment, in a case where the operation is accepted in a state where the mobile terminal 100 displays the software keyboard, the software keyboard is hidden in step S616 and the touched position information is transmitted to the MFP 110 in step S617. However, the mobile terminal 100 may simply hide the software keyboard without transmitting the touched position information to the MFP 110 in a case where the operation is accepted in a state where the mobile terminal 100 displays the software keyboard.

Figure 7:
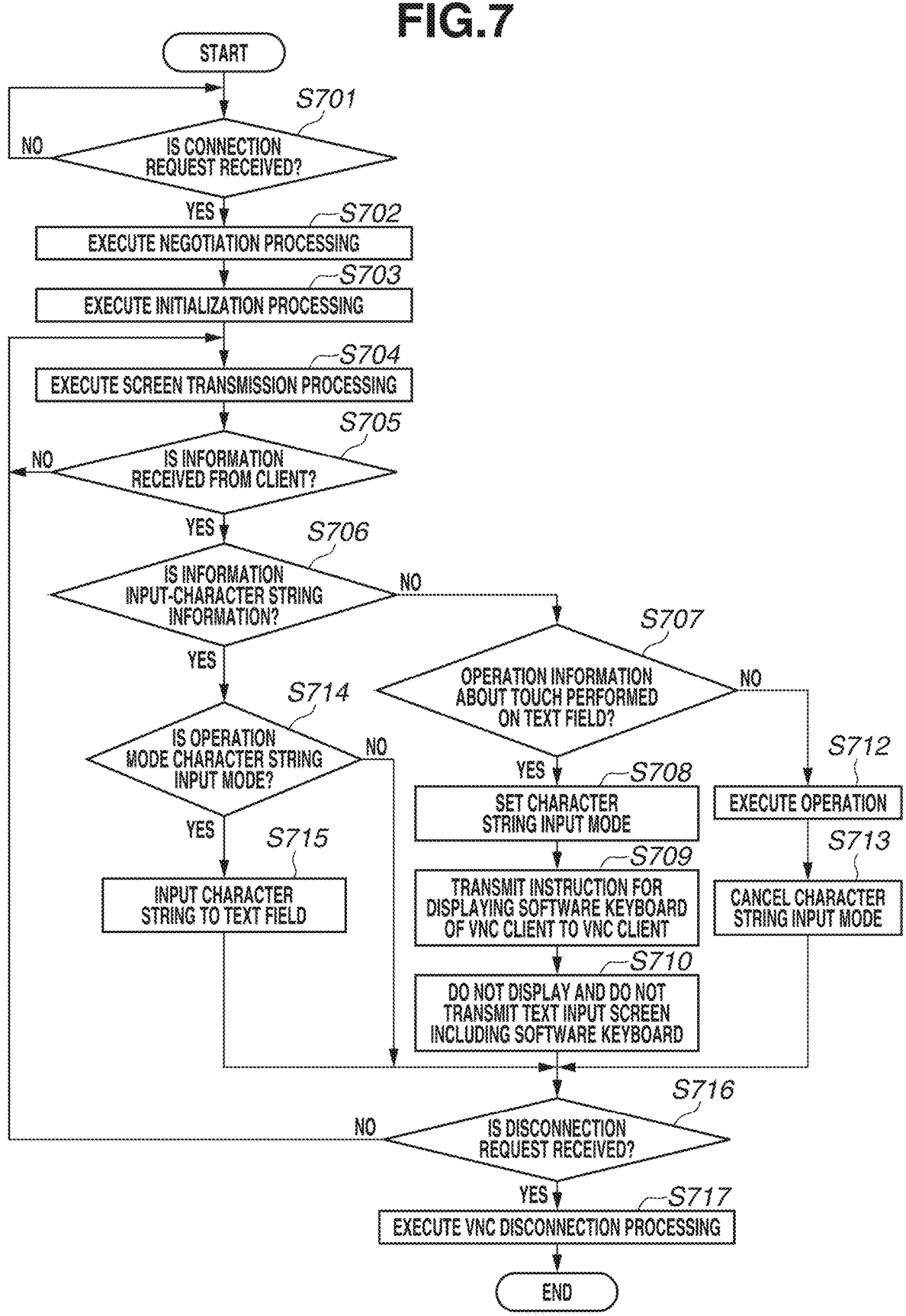
FIG. 7 is a flowchart illustrating processing of the information processing apparatus according to the present embodiment.

Processing executed by the MFP 110 in a case where a screen of the MFP 110 is synchronized with a screen of the mobile terminal 100 by using the VNC will be described with reference to FIG. 7. The CPU 3020 loads a control program stored in a memory, such as the ROM 3030, to the RAM 3040, and executes the control program to process each step illustrated in the flowchart in FIG. 7.

In step S701, the connection processing unit 523 determines whether a VNC connection request is received from the mobile terminal 100 operating as a VNC client. In a case where the connection request is received (YES in step S701), the processing proceeds to step S702. In a case where the connection request is not received (NO in step S701), the processing returns to step S701. In step S702, the connection processing unit 523 executes negotiation processing to connect the MFP 110 to the mobile terminal 100. In step S703, the connection processing unit 523 executes initialization processing, and executes reception of client information and transmission of server information.

In step S704, the screen transmission unit 521 transmits screen information corresponding to the screen displayed on the DISPLAY 3090 to the mobile terminal 100 operating as a VNC client. The processing in step S704 is executed each time when the screen displayed on the DISPLAY 3090 is updated according to a user operation or the like.

In step S705, the MFP 110 determines whether information is received from the mobile terminal 100. In a case where the information is received (YES in step S705), the processing proceeds to step S706. In a case where the information is not received (NO in step S705), the processing returns to step S704.

In step S706, the operation information receiving unit 522 determines whether the information received from the mobile terminal 100 is character input information. In a case where the received information is the character input information (YES in step S706), the processing proceeds to step S714. In a case where the received information is not the character input information (NO in step S706), the processing proceeds to step S707.

In step S707, the operation information receiving unit 522 determines whether the touched position information received in step S705 indicates execution of a touch operation with respect to a character input field (e.g., user name input field 911). In a case where the operation information receiving unit 522 determines that the touch operation is executed with respect to a character input field (YES in step S707), the processing proceeds to step S708. In a case where the operation information receiving unit 522 determines that the touch operation is not executed with respect to a character input field (NO in step S707), the processing proceeds to step S712.

In step S708, the operation information receiving unit 522 saves the information in the RAM 203 to cause the MFP 110 to operate in a character string input mode for accepting an input of a character from the mobile terminal 100.

In step S709, the MFP 110 transmits a notification for instructing the mobile terminal 100 to display and use its own software keyboard to the mobile terminal 100 operating as a VNC client.

In step S710, the UI processing unit 510 controls the DISPLAY 3090 not to display the software keyboard, and the screen transmission unit 521 does not transmit screen information of the screen displaying the software keyboard to the mobile terminal 100. In other words, the MFP 110 neither displays its own software keyboard on the DISPLAY 3090 nor transmits the screen displaying the software keyboard, even in a case where the user name input field 911 is touched via the mobile terminal 100, which connects to the MFP 110 by using the VNC. In the present embodiment, the MFP 110 neither displays its own software keyboard on the DISPLAY 3090 nor transmits the screen displaying the software keyboard. However, the MFP 110 may display its own software keyboard on the DISPLAY 3090 without transmitting the screen information of the screen displaying the software keyboard.

Examples of configurations for preventing transmission of screen information of a screen displaying a software keyboard to the mobile terminal 100 includes a configuration in which screen information of an updated screen is not transmitted to the mobile terminal 100 in step S704, even in a case where a screen on the DISPLAY 3090 is updated to another screen displaying the software keyboard, and a configuration in which screen information of a screen having a cursor placed on a selected character input field without displaying a software keyboard is transmitted to the mobile terminal 100 in step S704.

In the present embodiment, the MFP 110 does not display its own software keyboard when the MFP 110 is operated remotely, and displays its own software keyboard on the DISPLAY 3090 when the user name input field 911 is touched in a state where the MFP 110 is not operated remotely. Then, in a case where a character string "user1" is input on the text input screen 1110, an input-state text input screen 1120 is displayed on the DISPLAY 3090. Then, in a case where an OK button 1121 is pressed, the software keyboard is hidden, and a post-input log-in screen 1130 is displayed on the DISPLAY 3090.

In step S712, the operation information receiving unit 522 executes processing based on the touched position information and the operation information received in step S705. The processing includes, for example, processing for shifting a screen on the DISPLAY 3090.

In step S713, in a case where the character string input mode is enabled, the operation information receiving unit 522 disables the character string input mode, and save the information in the RAM 203. The processing in steps S707, S712, and S713 is commonly executed not only in a case where data is received from the VNC client but also in a case where a user input is accepted via the touch panel (PANEL) 3070.

In step S714, the operation information receiving unit 522 determines whether the MFP 110 is operating in the character string input mode. In a case where the MFP 110 is operating in the character string input mode (YES in step S714), the processing proceeds to step S715. In a case where the MFP 110 is not operating in the character string input mode (NO in step S714), the processing proceeds to step S716.

In step S715, the UI processing unit 510 inputs a character string to a text field based on the character input information received in step S705. For example, in a case where the character input information indicates a value "117", a letter "u" is displayed on the text field. Then, by the screen transmission processing executed in step S704, a screen which displays a letter "u" in the text field is displayed on the mobile terminal 100. In other words, a character input to the mobile terminal 100 is reflected on the DISPLAY 3090 on a real-time basis, and the mobile terminal 100 displays a screen on which the input is reflected. At this time, although the software keyboard is not displayed on the DISPLAY 3090 of the MFP 110, a character input to the mobile terminal 100 is displayed on the DISPLAY 3090. In the present embodiment, a character string is input to the text field based on the character input information received in step S705. However, even in a case where the character input information is received, a character string may not be displayed on the text field, may be hidden or masked or a character string may be displayed in a display pattern, such as an asterisk (*), which cannot be identified by the user, thus concealing the rendering of the character. This is because displaying a character string on the DISPLAY 3090 of the MFP 110 in a case where the MFP 110 is being operated remotely may create a security issue.

In step S716, the operation information receiving unit 522 determines whether a disconnection request of the connection using the VNC is received. In a case where the disconnection request is received (YES in step S716), the processing proceeds to step S717. In a case where the disconnection request is not received (NO in step S716), the processing returns to step S704.

In step S717, the connection processing unit 523 executes disconnection processing for the connection using the VNC, and ends the VNC connection.

In the above-described flowchart, a screen on the mobile terminal 100 is changed based on the operation accepted at the MFP 110 or the mobile terminal 100. Alternatively, even in a case where a screen displayed on the MFP 110 is changed without acceptance of an operation at the MFP 110 or the mobile terminal 100, the MFP 110 similarly transmits screen information of a changed screen to the mobile terminal 100, and the mobile terminal 100 displays the changed screen. With the above-described processing procedure illustrated in the flowchart, in a case where a character input item is selected and operated during the remote operation of the MFP 110, the MFP 110 neither displays its own software keyboard nor transmits screen information of a screen displaying its own software keyboard to the mobile terminal 100. In other words, in a case where the MFP 110 accepts a selection operation of a character input item and receives information about the selection operation, the MFP 110 does not display its own software keyboard. Since the software keyboard of the MFP 110 is not displayed in a case where the user performs a character input operation by using the software keyboard of the mobile terminal 100 operating as a VNC client, visibility of the remote operation screen is improved. If the software keyboard of the MFP 110 is also displayed even in a state where the mobile terminal 100 displays its own software keyboard during the VNC connection, other input items may be hidden behind the software keyboard of the MFP 110. Particularly, if a screen is shifted to a screen dedicated to a software keyboard, such as the text input screen 1110, when a character input item is selected, time and effort for bringing the screen back to the previous screen will be used.

In the above-described embodiment, a software keyboard of an information processing apparatus is hidden during a VNC connection. However, there can also be a case where a VNC client apparatus cannot display its own software keyboard. Thus, the information processing apparatus may hide its own software keyboard in a case where the VNC client apparatus can display its own software keyboard. For example, in a case where an error in displaying a software keyboard of the VNC client apparatus has occurred in the VNC client apparatus, the VNC client apparatus notifies information about the error to the information processing apparatus. The information processing apparatus may determine whether the VNC client apparatus can display its own software keyboard, based on client information received from the VNC client apparatus.

In the first embodiment, the MFP 110 transmits an instruction for displaying a software keyboard to the mobile terminal 100, and the mobile terminal 100 displays its own software keyboard for a character input operation. However, there can also be a case where the mobile terminal 100 can accept a character input operation using sound additionally, or alternatively, to a character input operation using a software keyboard.

In a second embodiment, a sound input function of the mobile terminal 100 is used for inputting a character to the MFP 110 to which the mobile terminal 100 connects using the VNC. Since a basic configuration is similar to the configuration described in the first embodiment, redundant descriptions will be omitted.

Figure 12:
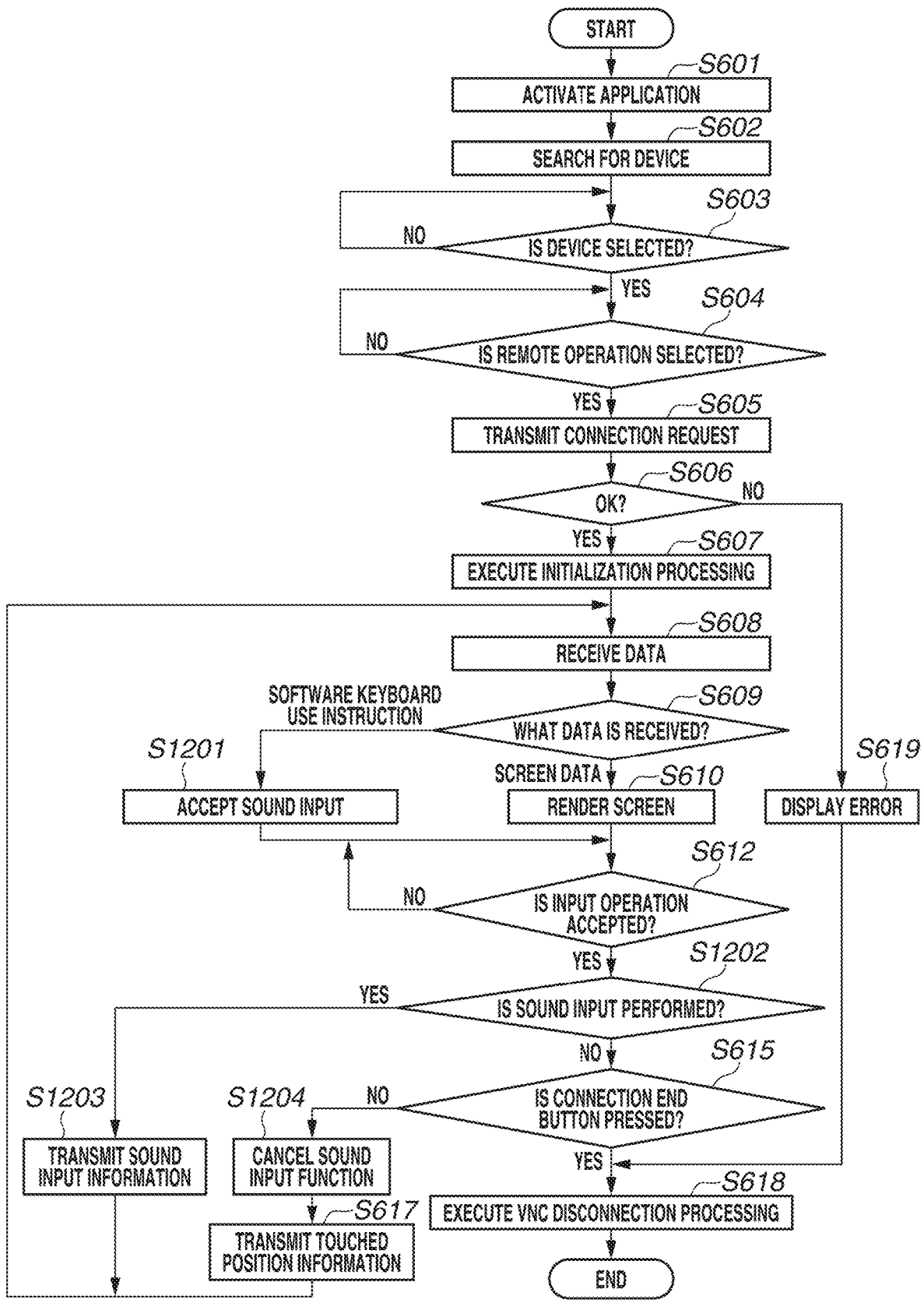
FIG. 12 is a flowchart illustrating processing of the mobile terminal according to the present embodiment.

FIG. 12 is a flowchart according to the present embodiment, which illustrates processing for executing a VNC connection between the mobile terminal 100 and the MFP 110 using the RFB protocol, displaying a screen, accepting a sound input operation, and ending the VNC connection. The CPU 201 loads a control program stored in a memory, such as the ROM 202 to the RAM 203, and executes the control program to process each step illustrated in the flowchart in FIG. 12. Redundant descriptions of the processing similar to the processing illustrated in FIG. 6 will be omitted.

In step S1201, the remote operation unit 313 waits for a sound input operation. For example, in a case where the keyboard log-in screen 910 is displayed on the DISPLAY 3090, a log-in initial screen 1300 is displayed on the operation panel 206. Herein, "sound input" refers to a function for converting a user's voice input to the microphone 208 into a character string.

In step S1202, the remote operation unit 313 determines whether a sound input operation is executed.

In a case where a sound input operation is executed (YES in step S1202), the processing proceeds to step S1203. In a case where a sound input operation is not executed (NO in step S1202), the processing proceeds to step S615.

In step S1203, the remote operation unit 313 transmits ASCII information on a character corresponding to an input performed by the sound input operation to the MFP 110. For example, in a case where a letter "u" is input, a value "117" is transmitted. In a case where letters "u", "s", "e", "r", and "l" are input to the log-in initial screen 1300 by the sound input operation, an input-state log-in screen 1320 is displayed on the operation panel 206.

In step S1204, the sound input accepting function is cancelled. In a case where the user executes a touch operation on the input-state log-in screen 1320 in an area different from the end button, the log-in screen (after input) 1030 is displayed on the operation panel 206.

With the above-described processing illustrated in the flowchart, a character can be input to the MFP 110 to which the mobile terminal 100 performs a VNC connection, using the sound input function of the mobile terminal 100.

Other Embodiments

In the above-described embodiments, the same screen as the screen displayed on the MFP 110 is displayed on the mobile terminal 100 by using the VNC connection. However, the present embodiment is not limited thereto. For example, the above-described embodiments are also applicable to a case where an expansion screen of a screen on the MFP 110 is displayed on the mobile terminal 100, instead of displaying the same screen as the screen being displayed on the MFP 110.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-038672, filed Mar. 10, 2021, which is hereby incorporated by reference herein in its entirety.

What is claimed is:

1. An information processing apparatus comprising:
a first display unit configured to display an operation screen;
a memory; and
at least one processor in communication with the memory, wherein the at least one processor is configured to perform:
causing a terminal apparatus to display, on a second display unit of the terminal apparatus, a terminal screen corresponding to the operation screen being displayed on the first display unit, via communication by a Remote Framebuffer (RFB) protocol; and
executing control to display or not display a first software keyboard on the operation screen displayed on the first display unit based on an acceptance process of a character-input-region selection operation,
wherein
in a case where the selection operation is accepted by the information processing apparatus, based on an input received at a character input region displayed on the first display unit, the first software keyboard is displayed on the operation screen displayed on the first display unit, and
in a case where the selection operation is received at a character input region displayed on the second display unit of the terminal apparatus and the selection operation is accepted at the information processing apparatus via the communication from the terminal apparatus by the RFB protocol, the first software keyboard is not displayed on the operation screen displayed on the first display unit.

2. The information processing apparatus according to claim 1, wherein the information processing apparatus is further configured to receive operation information corresponding to an operation accepted on the terminal screen that is displayed on the second display unit of the terminal apparatus, based on screen information transmitted from the information processing apparatus to the terminal apparatus, and to execute processing corresponding to the operation information, to updates the operation screen being displayed on the first display unit, and is configured to transmit screen information corresponding to the updated operation screen to the terminal apparatus.

3. The information processing apparatus according to claim 1, wherein the information processing apparatus transmits an instruction for displaying a second software keyboard of the terminal apparatus on the second display unit and the second software keyboard is used for a plurality of applications operating on the terminal apparatus.

4. The information processing apparatus according to claim 1, wherein, when the information processing apparatus accepts the selection operation received at the character input region displayed on the second display unit of the terminal apparatus, and receives information about the selection operation from the terminal apparatus, and in a case where the terminal apparatus displays the second software keyboard of the terminal apparatus, the information processing apparatus is configured to transmit screen information corresponding to an operation screen not displaying the first software keyboard to the terminal apparatus, and in a case where the terminal apparatus does not display the second software keyboard of the terminal apparatus, the information processing apparatus is configured to transmit screen information corresponding to an operation screen displaying the first software keyboard to the terminal apparatus.

5. The information processing apparatus according to claim 4, wherein the case where the terminal apparatus does not display the second software keyboard of the terminal apparatus refers to a case where an error in displaying the second software keyboard has occurred in the terminal apparatus.

6. The information processing apparatus according to claim 1, wherein the terminal screen that is displayed on the second display unit of the terminal apparatus is the same screen as the operation screen being displayed on the first display unit.

7. The information processing apparatus according to claim 1, wherein the character-input region is a region to which user information for logging into the information processing apparatus is input.

8. The information processing apparatus according to claim 1, wherein, each time an input of a character is accepted via the second software keyboard of the terminal apparatus, the information processing apparatus is configured to receive information about the input character, and configured to display a screen to which the character is input, on the first display unit.

9. The information processing apparatus according to claim 8, wherein the screen to which the character is input is a screen in which the character is input to a character-input field and the rendering of the character is concealed.

10. The information processing apparatus according to claim 1, wherein, in a case where the information processing apparatus accepts an input of a character via the second software keyboard of the terminal apparatus and receives information about the input character from the terminal apparatus, the information processing apparatus is configured to control the first display unit so as not to display a screen to which the character is input.

11. The information processing apparatus according to claim 1, wherein the information processing apparatus is a multifunction peripheral (MFP) having a plurality of functions including a printing function.

12. The information processing apparatus according to claim 1, wherein the information processing apparatus operates as a virtual network computing (VNC) server, and the terminal apparatus operates as a VNC client.

13. The information processing apparatus according to claim 1, wherein, in a case where the information processing apparatus accepts the selection operation received at the character input region that is displayed on the second display unit of the terminal apparatus, and receives information about the selection operation from the terminal apparatus, the information processing apparatus is configured to transmit an instruction for displaying the second software keyboard on the second display unit, to control the first display unit not to display the first software keyboard, and to not transmit screen information corresponding to an operation screen displaying the first software keyboard.

14. A system including the information processing apparatus according to claim 1 and the terminal apparatus defined in claim 1, wherein, in a case where the information processing apparatus transmits an instruction for displaying a second software keyboard of the terminal apparatus to the terminal apparatus and controls the first display unit not to display the first software keyboard, the terminal apparatus is configured to display, on the second display unit, a first screen, which is displayed based on screen information transmitted from the information processing apparatus to the terminal apparatus, not displaying the first software keyboard and a second screen displaying the second software keyboard.

15. The system according to claim 14, wherein, in a case where the second software keyboard is displayed on the second display unit of the terminal apparatus, even when an operation in an area different from an area of the second software keyboard included in the screen that is displayed on the second display unit based on the transmitted screen information, is accepted, the terminal apparatus is configured not to transmit information about the operation to the information processing apparatus.

16. A method for an information processing apparatus comprising:

a first display unit configured to display an operation screen;

causing a terminal apparatus to display, on a second display unit of the terminal apparatus, a terminal screen corresponding to the operation screen being displayed on the first display unit, via communication by a Remote Framebuffer (RFB) protocol; and executing control to display or not display a first software keyboard on the operation screen displayed on the first display unit based on an acceptance process of a character-input-region selection operation, wherein in a case where the selection operation is accepted by the information processing apparatus, based on an input received at a character input region displayed on the first display unit, the first software keyboard is displayed on the operation screen displayed on the first display unit, and in a case where the selection operation is received at a character input region displayed on the second display unit of the terminal apparatus and the selection operation is accepted at the information processing apparatus via the communication from the terminal apparatus by the RFB protocol, the first software keyboard is not displayed on the operation screen displayed on the first display unit.

17. The information processing apparatus according to claim 1, further comprising causing the terminal apparatus to display a screen corresponding to an updated screen based on the operation screen being displayed on the first display unit having been updated.

18. The information processing apparatus according to claim 1, wherein the terminal apparatus is caused to display a screen corresponding to an updated screen each time the operation screen being displayed on the first display unit is updated.

19. The information processing apparatus according to claim 1, wherein control is executed to display a second software keyboard on the second display unit of the terminal apparatus and not to display the first software keyboard on the first display unit of the information processing apparatus in accordance with acceptance of a selection operation, from the terminal apparatus via the communication by the RFB protocol, on a region of the screen displayed on the second display unit of the terminal apparatus, where a character is input.

20. The information processing apparatus according to claim 1, wherein causing a terminal apparatus to display a second software keyboard on the second display unit of the terminal apparatus and not to display the first software keyboard on the first display unit of the information processing apparatus in accordance with acceptance of a selection operation, received from the terminal apparatus via the communication by the RFB protocol, on a region of a screen displayed on the second display unit of the terminal apparatus, where a character is input.

21. The information processing apparatus according to claim 1, wherein control is executed to transmit an instruction to display a second software keyboard on the second display unit of the terminal apparatus and not to display the first software keyboard on the first display unit of the information processing apparatus in accordance with acceptance of a selection operation, received from the terminal apparatus via the communication by the RFB protocol, on a region of a screen displayed on the second display unit of the terminal apparatus, where a character is input.

* * * * *